(12) United States Patent
Kirino et al.

(10) Patent No.: US 6,749,955 B2
(45) Date of Patent: Jun. 15, 2004

(54) INFORMATION RECORDING MEDIA AND INFORMATION RECORDING DRIVE

(75) Inventors: Fumiyoshi Kirino, Tokyo (JP); Nobuyuki Inaba, Hasuda (JP); Hiroki Yamamoto, Hitachi (JP); Takashi Naitou, Hitachiota (JP); Ken Takahashi, Tokai (JP); Eiji Koyama, Tsuchiura (JP); Motoyasu Terao, Hinode (JP); Sumio Hosaka, Hinode (JP); Hiroki Kuramoto, Yokohama (JP)

(73) Assignees: Hitachi, Ltd., Tokyo (JP); Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 10/349,440

(22) Filed: Jan. 23, 2003

(65) Prior Publication Data

US 2003/0134154 A1 Jul. 17, 2003

Related U.S. Application Data

(63) Continuation of application No. 09/604,132, filed on Jun. 27, 2000, now Pat. No. 6,534,206.

(30) Foreign Application Priority Data

Jun. 28, 1999 (JP) .......................................... 11-181428

(51) Int. Cl.$^7$ ............................. B32B 9/00; G11B 5/66; G11B 5/70
(52) U.S. Cl. ............................... 428/693; 428/694 TS; 428/694 TM; 428/336; 428/900
(58) Field of Search ................... 428/694 TS, 694 TM, 428/900, 336

(56) References Cited

U.S. PATENT DOCUMENTS

| | | | | |
|---|---|---|---|---|
| 4,652,499 | A | | 3/1987 | Howard ........................ 428/641 |
| 5,693,200 | A | * | 12/1997 | Tyan et al. ............. 204/192.26 |
| 5,851,643 | A | | 12/1998 | Honda et al. ................ 428/212 |
| 6,221,508 | B1 | * | 4/2001 | Kanbe et al. ................ 428/617 |
| 6,410,133 | B1 | * | 6/2002 | Kirino et al. ................ 428/336 |
| 6,472,047 | B1 | * | 10/2002 | Kirino et al. ................ 428/141 |
| 6,534,206 | B1 | * | 3/2003 | Kirino et al. ......... 428/694 SC |
| 2002/0110707 | A1 | * | 8/2002 | Kirino et al. ....... 428/694 OTS |
| 2002/0197516 | A1 | * | 12/2002 | Kirino et al. ....... 428/694 OTS |

FOREIGN PATENT DOCUMENTS

JP    1-251356    10/1989

\* cited by examiner

Primary Examiner—Holly Rickman
(74) Attorney, Agent, or Firm—Kenyon & Kenyon

(57) ABSTRACT

An ultra-high density information recording media has an inorganic compound layer 12 on a substrate 11, and in the inorganic compound layer 12, an oxide of at least one kind selected from silicon oxide, aluminum oxide, titanium oxide, tantalum oxide, and zinc oxide exists in an amorphous state at a grain boundary of crystal grain of an oxide of at least one kind selected from cobalt oxide, iron oxide, and nickel oxide. The media has a magnetic layer 13 made of an artificial lattice multilayer obtained by alternately laminating a Co layer or an alloy layer consisting of Co as a main phase and a metal element layer of at least one kind selected from Pt and Pd onto the layer 12. Thus, a distribution of magnetic properties serving as a pinning site of the movement of a magnetic wall in case of recording information to the magnetic layer 13 is formed in the magnetic layer 13.

7 Claims, 6 Drawing Sheets

INFORMATION RECORDING MEDIA AND INFORMATION RECORDING DRIVE

This is a continuation of application Ser. No. 09/604,132 filed Jun, 27, 2000, the entire content of which is herein incorporated by reference.

CROSS-REFERENCE TO RELATED APPLICATION

This application relates to U.S. patent application Ser. No. to be assigned based on Japanese Patent Application No. 11-181434 filed Jun. 28, 1999 entitled "MAGNETIC RECORDING. DISK" by F. Kirino, et al., the disclosure of which is incorporated herein by reference.

BACKGROUND OF THE INVENTION

The invention relates to an information recording media for promptly and accurately storing a large amount of information and, more particularly, to an information recording media for use as an information recording disk having high performance and high reliability and a magnetic storage apparatus and an magneto-optical storage apparatus using such a media.

DESCRIPTION OF THE RELATED ART

The progress of the recent advanced information society is remarkable and a multimedia in which information of various formats has been integrated is being rapidly spread. As an information recording apparatus which supports it, there are a magnetic recording disk drive and a magneto-optical recording disk drive. At present, in the magnetic recording disk drive, miniaturization is being realized while improving a recording density. In association with it, the realization of a low price of the disk drive is being rapidly progressed. To realize a high density of the magnetic recording disk, techniques (1) to shorten a distance between the magnetic recording disk and a magnetic head, (2) to increase coercivity of a magnetic recording media, (3) to devise a signal processing method, and the like are indispensable techniques. Among them, in the magnetic recording media, an increase in coercivity is indispensable to realize a high density recording. In addition to it, to realize a recording density exceeding 20 Gb/in$^2$, a unit in which a magnetization reversal occurs has to be reduced. For this purpose, it is necessary to microfine a size of magnetic crystal grain. As a method of realizing it, a method whereby a shield layer is provided under a magnetic layer has been proposed. As an example of such a method, U.S. Pat. No. 4,652,499 can be mentioned.

In a magneto-optical recording disk drive for writing, reading, or erasing by using a laser beam, it is effective to form a micro magnetic domain by using a laser beam of a short wavelength. In this case, since a Kerr effect shown by an amorphous alloy of a rare earth element and an iron group element as a recording media decreases in association with a decrease in wavelength of the laser beam, a read output to noise ratio (S/N) decreases and there is a case where a stable information recording cannot be performed. To solve such a problem, an artificial lattice layer obtained by alternately laminating Pt and Co showing a large Kerr effect even in a short wavelength region of 400 nm or less has been proposed. As an example of such a layer, JP-A-1-251356 can be mentioned.

SUMMARY OF THE INVENTION

In the above related art, first, in the magnetic recording disks, there is a limitation in a grain-size distribution control of crystal grain of an information recording magnetic layer by a shield layer and there is a case where both micro grain and enlarged grain exist. In case of reversing the magnetization and recording information, the micro grain is influenced by a leakage magnetic field from the peripheral magnetic crystal grain and the enlarged grain causes an interaction with the peripheral magnetic crystal grain to the contrary. Therefore, when an ultra-high density magnetic recording exceeding 20 GB/inch$^2$ is performed, there is a case where the stable recording cannot be performed. This problem also similarly occurs in a magnetic recording disk having a magnetic layer for longitudinal magnetic recording and in a magnetic recording disk having a magnetic layer for perpendicular magnetic recording of the Co—Cr system.

In the magneto-optical recording, if the artificial lattice layer obtained by alternately laminating Pt and Co is used as a recording layer, although a large Kerr rotational angle is obtained even in the short wavelength region of 400 nm or less, a moving speed of a magnetic wall is high. Particularly, in case of performing a mark length recording, it becomes a cause of a jitter and the stable writing or read-back cannot be performed.

In consideration of the problems of such a related art, it is an object of the invention to provide an information recording media suitable for performing an ultra-high density magnetic recording, namely, a magnetic recording media or magneto-optical recording media. Another object of the invention is to provide a magnetic storage apparatus and a magneto-optical storage apparatus which are suitable for an ultra-high density magnetic recording.

The above objects are accomplished by controlling a distribution of a magnetization reversal size of a magnetic layer in an information recording media. The above objects are also accomplished by providing a portion serving as a pinning site of the movement of a magnetic wall for a magnetic layer in an information recording media.

That is, an information recording media according to the invention is characterized in that: it includes a substrate, an inorganic compound layer formed on the substrate, and a magnetic layer formed on the inorganic compound layer; the inorganic compound layer is a layer in which an oxide of at least one kind selected from silicon oxide, aluminum oxide, titanium oxide, tantalum oxide, and zinc oxide exists in an amorphous state at a grain boundary of crystal grain of an oxide of at least one kind selected from cobalt oxide, iron oxide, and nickel oxide; and the magnetic layer is an artificial lattice multilayer obtained by alternately laminating a Co layer or an alloy layer consisting of Co as a main phase and a metal element layer of at least one kind selected from Pt and Pd. As an alloy consisting of Co as a main phase, for example, Co—Cr, Co—Cr—Pt, or Co—Cr—Ta can be used.

The inorganic compound layer has a honeycomb structure in which hexagonal crystal grains are two-dimensionally and regularly arranged when it is seen from the direction that is perpendicular to a layer surface. It is preferable that the crystal grain in the inorganic compound layer has a grain-size distribution in which a standard deviation of the grain-size distribution of the crystal grain when it is seen in the in-plane direction is equal to or less than 10% of an average grain size. It is also desirable that a thickness of inorganic compound layer lies within a range from 10 nm or more to 100 nm or less. A lower limit of the layer thickness is equal to a thickness at which the inorganic compound layer can be stably formed and an upper limit is determined by an internal stress which the inorganic compound layer has.

The magnetic layer has the same crystal shape as that of the crystal grain in the inorganic compound layer and is formed by epitaxially growing crystal grain of the magnetic layer in a column shape onto a crystal phase of the inorganic compound layer. Thus, the crystal grain of the magnetic layer exists in correspondence to the crystal grain in the inorganic compound layer and amorphous or polycrystalline magnetic crystal grain exists in correspondence to a grain boundary phase of the inorganic compound layer. To form the magnetic layer of the artificial lattice multilayer structure onto the inorganic compound layer, it is preferable to use a structure in which a Co layer is used as a first layer, the Co layer of the first layer is epitaxially grown from the crystal grain of the inorganic compound layer, and Co which is formed in the grain boundary phase is polycrystalline or amorphous.

A change in magnetic properties occurs in the magnetic layer in the layer surface direction due to a difference of the crystalline structure. That is, as for the magnetic layer, the magnetic properties of at least one of the magnetic anisotropy, coercivity, and saturation magnetization differs in dependence on the portion which was epitaxially grown on the crystal phase of the inorganic compound layer and the portion grown on the grain boundary phase. Thus, the moving speed of the magnetic wall can be controlled by setting a pinning site of the magnetic wall movement in the amorphous or polycrystalline region. By reflecting the structure of the inorganic compound layer of the lower layer and providing a portion of a different crystalline structure into the magnetic layer as mentioned above, a distribution of the magnetic properties can be formed in the magnetic layer. If the distribution of the magnetic properties was formed in the magnetic layer, since the moving speed of the magnetic wall in the magnetic domain which is formed in the magnetic layer can be controlled in case of recording information, the size of formed magnetic domain or the precision of the position can be improved.

The information recording media according to the invention can be used as a magnetic recording media for the magnetic storage apparatus or a magneto-optical recording media for the magneto-optical storage apparatus. The substrate can be made of an organic compound, an inorganic compound, or a metal. A glass substrate is suitable as a substrate made of an inorganic compound. A substrate made of Al or an Al alloy can be used as a substrate made of a metal. An NiP layer can be also formed on the substrate made of an inorganic compound or metal. A high molecular material such as polycarbonate, polymethyl methacrylate (PMMA), amorphous polyolefin (APO), epoxy resin, or the like can be used as a substrate made of an organic compound.

According to the invention, there is provided a magnetic storage apparatus comprising: a magnetic recording media; a magnetic recording medium driver for driving the magnetic recording media; a magnetic head for performing a writing and a read to/from the magnetic recording media; a magnetic head access system for accessing the magnetic head; and a read/write signal processing system for processing a write signal and a read signal of the magnetic head, wherein the foregoing information recording media is used as a magnetic recording media.

According to the invention, there is provided a magneto-optical storage apparatus comprising: a magneto-optical recording media; a magneto-optical recording medium driver for driving the magneto-optical recording media; an optical head for performing a writing and a read to/from the magneto-optical recording media; an optical head access system for accessing the optical head; a signal processing system for processing a write signal and a read signal of the optical head; and magnetic field applying means for applying a magnetic field to a region on the magneto-optical recording media at a place near the optical head, wherein the foregoing information recording media is used as a magneto-optical recording media.

DETAILED DESCRIPTION OF THE EMBODIMENTS

Embodiments of the invention will now be described hereinbelow with reference to the drawings.

[Embodiment 1]

An information recording media for magnetic recording (hereinafter, referred to as a magnetic recording disk) was manufactured. A magnetic recording disk drive in which the magnetic recording disk has been assembled was manufactured.

Figure 1:
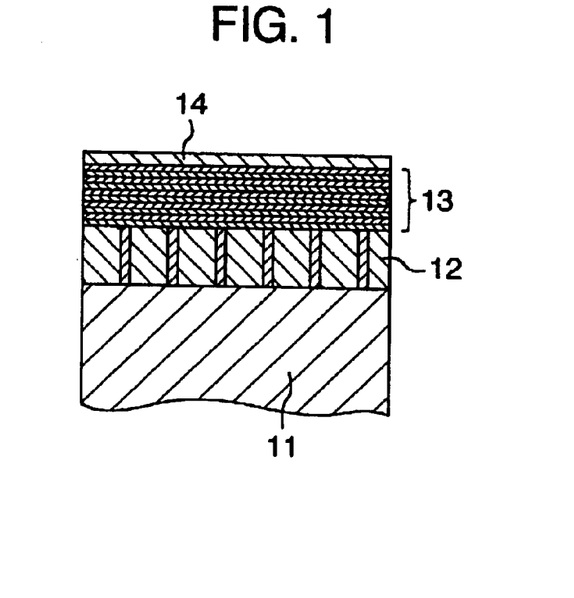
FIG. 1 is a cross sectional schematic diagram of a magnetic recording disk.

FIG. 1 is a cross sectional schematic diagram of the manufactured magnetic recording disk. The magnetic recording disk has a laminated structure obtained by sequentially forming an inorganic compound layer 12, a magnetic layer 13, and a protective layer 14 onto a substrate 11. A glass substrate having a diameter of 2.5 inches is used as a substrate 11 for the magnetic recording disk. An object obtained by mixing CoO and $SiO_2$ at a mol ratio of 2:1 is used as a target, pure Ar is used as a discharge gas, and the inorganic compound layer 12 is formed on the substrate 11 by a sputtering method. A thickness of the formed inorganic compound layer 12 is equal to 30 nm. An Ar pressure upon sputtering is equal to 3 mTorr and an input RF electric power is equal to 1 kW/150 mm$\phi$.

Figure 2:
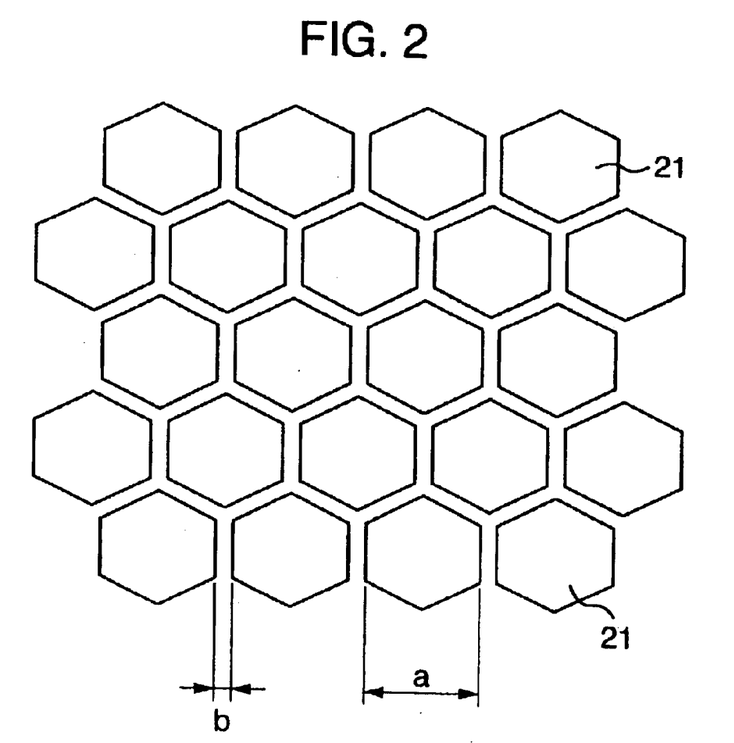
FIG. 2 is a schematic diagram showing a TEM observation result of the surface of an inorganic compound layer.

FIG. 2 is a schematic diagram showing a result obtained by observing the surface of the obtained inorganic compound layer 12 by a transmission electron microscope (TEM). As shown in the diagram, the inorganic compound layer 12 has a honeycomb structure in which almost regular hexagonal crystal grain 21 is two-dimensionally and regularly arranged. A target obtained by mixing CoO powder and $SiO_2$ powder at a mol ratio of 2:1 and sintering a resultant mixture is used here. However, a layer of a similar structure is also derived by a dual simultaneous sputtering method using a CoO target and an $SiO_2$ target.

Figure 3:
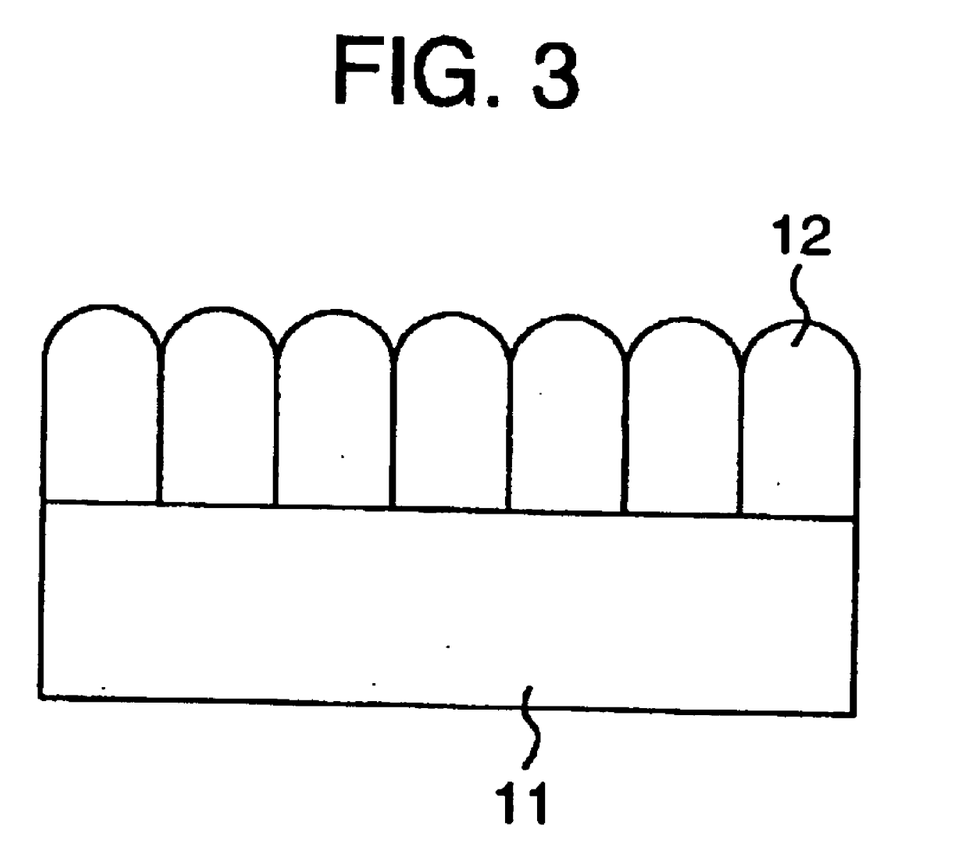
FIG. 3 is a schematic diagram showing a cross section of the inorganic compound layer.

FIG. 3 is a schematic diagram showing a result obtained by observing the cross section of the inorganic compound layer 12 by the TEM. As shown in FIG. 3, columnar tissues in the direction that is perpendicular to the substrate 11 are observed in the cross section of the inorganic compound layer 12. It has been found that the columnar tissue was grown without increasing the crystal grain during the growth.

Figure 4:
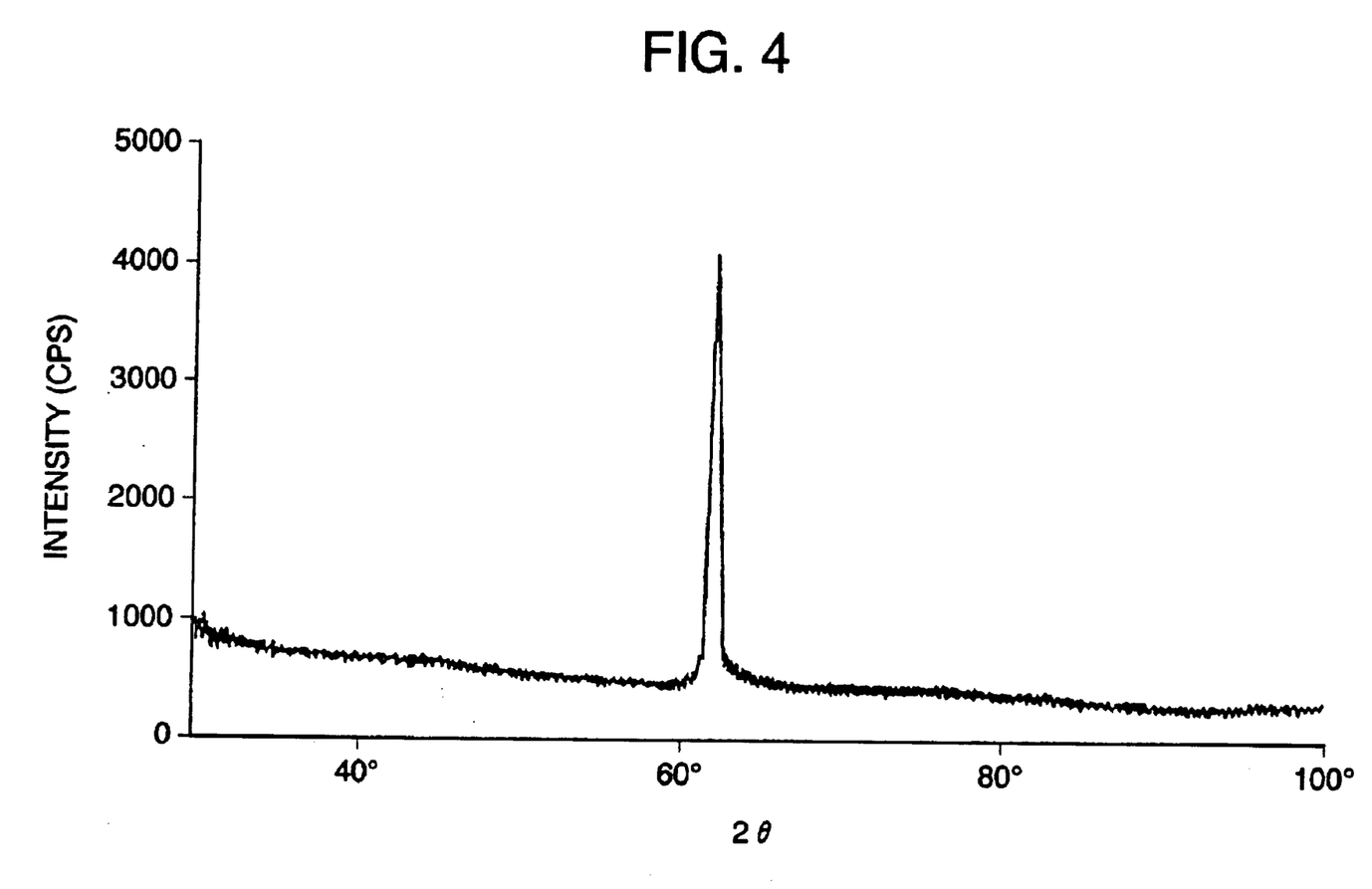
FIG. 4 is a diagram showing an X-ray diffraction profile of the inorganic compound layer.

The crystal grain 21 and its grain boundary are analyzed by an EDX analysis ($\mu$-EDX analysis) of a micro region, so that the crystal grain 21 is a Co oxide and $SiO_2$ exists at the grain boundary. The crystalline structure of the inorganic compound layer 12 are analyzed by a $\theta$–$2\theta$ X-ray diffraction method, so that an X-ray diffraction profile shown in FIG. 4 is obtained. In FIG. 4, an axis of abscissa indicates an angle $2\theta$ and an axis of ordinate indicates a relative value of an X-ray diffraction intensity. As shown in the diagram, a diffraction peak of (220) of CoO is observed at a position near $2\theta=62.5°$ and the other peaks are not observed. From an observation of a lattice image, it has been found that a cobalt oxide is crystalline and a silicon oxide is amorphous. A lattice constant obtained is almost equal to a value of Co. The lattice constant can be controlled in accordance with layer forming conditions and, further, by adding a metal. (for example, chromium, iron, nickel, or the like) of a different ion radius into CoO or by adding oxides of those metals therein.

A grain-size distribution in the layer surface of the crystal grain 21 is subsequently measured by the following procedure. A plane TEM image obtained by the TEM observation is fetched as image information into a computer and 250 pieces of crystal grains are selected at random from the crystal grain image observed in the same field of view. By image processing with respect to each of the selected crystal grains by the computer, an outline of each crystal grain is extracted. An area occupied by each crystal grain is obtained by calculating an internal area surrounded by the outline. Since the crystal grain observed by the TEM has almost a regular hexagonal shape, it is assumed that the shape of the crystal grain is a regular hexagon. A length of side of the crystal grain is calculated on the basis of the area of each crystal grain obtained by the image processing operation, thereby obtaining a crystal grain size. With respect to the obtained crystal grain size, for example, the number of crystal grains having a crystal grain size within a range from 5 nm or less than 6 nm, the number of crystal grains having a crystal grain size within a range from 6 nm or less than to 7 nm, the number of crystal grains having a crystal grain size within a range from 7 nm or less than to 8 nm, and the like are counted, respectively. A frequency distribution of the crystal for the crystal grain size is obtained and this distribution is statistically processed, so that a mean value of the crystal grain sizes and a standard deviation of the distribution of the crystal grain sizes are obtained. The grain-size distribution of the crystal grain obtained in this manner has a normal distribution. An average of the grain sizes (dimension between the opposite parallel sides) a of the crystal grain 21 is equal to 10 nm and a standard deviation a of the grain-size distribution is equal to 0.9 nm. A distance b between the crystal grains is equal to 2 nm.

The number of crystal grains existing around one crystal grain is subsequently obtained by using the TEM image of the surface of the inorganic compound layer in accordance with the following procedure. The plane TEM image obtained from the TEM image observation is fetched as image information into the computer and image processed by the computer, thereby extracting the outline of the grain boundary portion of the crystal grain. The 250 pieces of crystal grains are selected at random from the outline image and the number of crystal grains existing adjacently, namely, the number of coordinations of the crystal grains is counted with respect to each crystal grain. As for the obtained number of coordinations, for example, the number of crystal grains having five coordinations, the number of crystal grains having six coordinations, the number of crystal grains having seven coordinations, and the like are counted, thereby obtaining a frequency distribution of the crystal for the number of coordinates. The average number of coordinates is obtained by statistically processing such a distribution. The 250 pieces of crystal grains are examined, so that the average number of coordinates is equal to 6.03. Also from the above results, it is backed up that the crystal grains having hexagonal shapes of similar grain sizes are two-dimensionally and regularly arranged to thereby form a honeycomb structure.

An ultra structure multilayer (artificial lattice layer) is formed as a magnetic layer 13 onto the inorganic compound layer 12 by alternately laminating a Co layer and a Pt layer. The alternate lamination of the Co layer and Pt layer is performed by a dual simultaneous sputtering method. In this instance, a time difference is provided and a shutter of a sputtering apparatus is opened so that the first layer becomes the Co layer. An input DC electric power is equal to 1 kW/150 mm$\phi$.

A structure of the formed magnetic layer 13 is observed by the cross sectional TEM. Thus, as for the thickness of magnetic layer, a thickness of Co layer is equal to 0.6 nm and a thickness of Pt layer is equal to 1.8 nm. A thickness of the whole magnetic layer is equal to 50 nm. As for the thickness of Co layer and the thickness of Pt layer (or Pd layer), it is desirable that a ratio of the thicknesses of both of them is set to Pt(Pd):Co=2:1 to 5:1 and the thickness of Co layer is equal to or less than 1 nm. When the thicknesses of the Co layer and Pt layer (or Pd layer) lie within such a range, a perpendicular magnetization layer having excellent magnetic properties can be obtained. The magnetic layer 13 and inorganic compound layer 12 are observed from a crystallographic viewpoint, so that although the Co layer formed on the crystal phase of the inorganic compound layer 12 was epitaxially grown, the Co layer formed on the crystal grain boundary is a bulk substance of micro crystal or a polycrystalline substance. Although a DC sputtering has been used here to form the magnetic layer 13, an RF sputtering or ion beam sputtering can be also used. The magnetic properties and layer structure of the magnetic layer 13 are not influenced by the sputtering system.

After the magnetic recording disk was magnetized in a constant direction, the surface is observed by a polarization microscope. Thus, it has been found that although the portion corresponding to the region on the crystal phase of the inorganic compound layer 12 becomes a good perpendicular magnetization layer, the portion corresponding to the region on the grain boundary is not the perpendicular magnetization layer. This result will be understood because in the region magnetized in the perpendicular direction, when a polarizing plate is rotated, a reversal of light and dark occurs. The portion corresponding to the region on the grain boundary of the inorganic compound layer 12 is held to be gray and the brightness does not change. The magnetic properties of the magnetic layer 13 are measured, so that the magnetic properties in which a coercivity is equal to 3.0 kOe and a perpendicular magnetic anisotropy energy is equal to $5\times10^7$ erg/ml are obtained.

Finally, a carbon layer having a thickness of 5 nm is formed as a protective layer 14. As conditions for sputtering, an input DC power density is equal to 0.5 kW/150 mm$\phi$ and a discharge gas pressure is equal to 5 mTorr. Although Ar is used here as a sputtering gas, a gas containing nitrogen or a gas containing nitrogen and hydrogen can be also used. Since the grain is microfined if the gas containing nitrogen or the gas containing nitrogen and hydrogen is used, a resultant layer becomes fine and protecting performance can be improved.

Figure 5A:
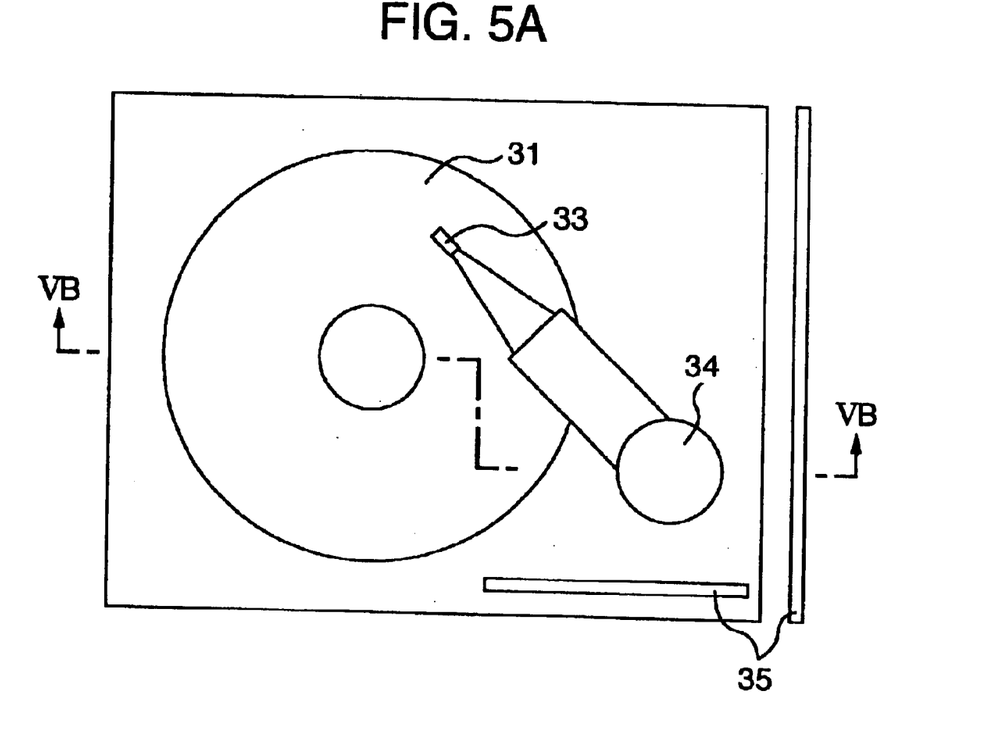
FIG. 5A is a schematic plan view of a magnetic recording disk drive.
Figure 5B:
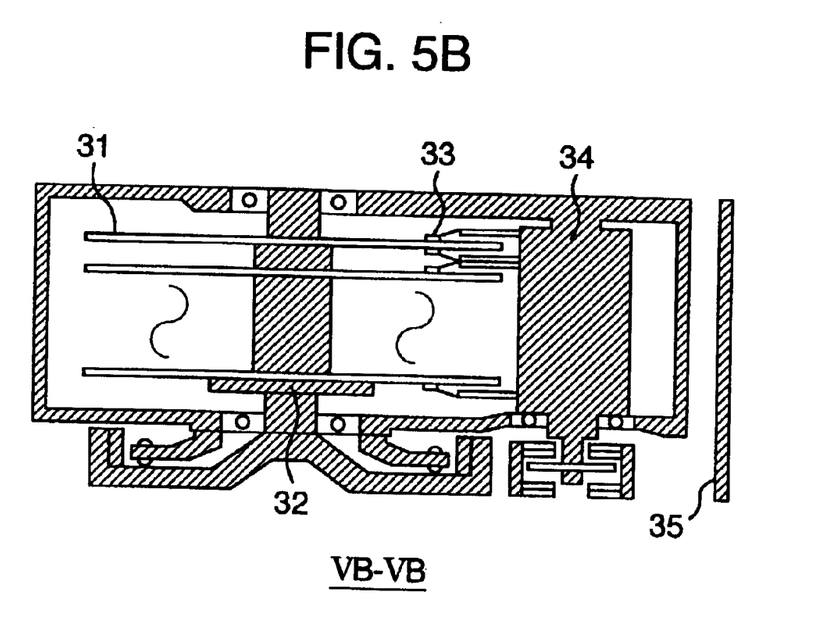
FIG. 5B is a cross sectional view taken along the arrows VB—VB in FIG. 5A.

After a high polymer material having a straight chain structure whose molecular weight is equal to or larger than 3000 was coated as a lubricant onto the surface of the magnetic recording disk manufactured as mentioned above, the disk is assembled into the magnetic recording disk drive schematically shown in FIGS. 5A and 5B and read/write characteristics of the magnetic recording disk are evaluated. As shown in FIG. 5A as a schematic plan view of the magnetic recording disk drive and FIG. 5B as a cross sectional view of such a drive taken along the arrows VB—VB in FIG. 5A, it is the drive of a well-known construction comprising: a magnetic recording disk 31 which is rotated by a magnetic recording disk medium driver 32; a magnetic head 33 which is held by a magnetic head access system 34 and performs a writing and a read-back to/from the magnetic recording disk 31; and a read/write signal processing system 35 for processing a write signal and a read signal of the magnetic head 33.

A ring type magnetic head having a soft magnetic layer of a high saturation magnetic flux density of 2.1T is used for recording. A spin-valve magnetoresistive head is used for read-back. A distance between the head surface and the magnetic layer 13 is equal to 20 nm. A signal corresponding to 30 GB/inch$^2$ is recorded onto the magnetic recording disk by a zone bit recording system and an S/N ratio of the disk is evaluated, so that a read output of 32 dB is obtained. An error rate of the disk is measured, so that it is equal to or less than $1 \times 10^{-5}$ as a value at the timing when no signal process is performed. The disk is observed by a magnetic force microscope (MFM), so that a zigzag pattern existing on a magnetic wall around the magnetic domain is also remarkably smaller than that of the media of the related art.

The signal corresponding to 20 Gb/in$^2$ is recorded onto the magnetic recording disk by using the magnetic head. With respect to this recording pattern, the read operation is performed just after the end of the recording operation and after the disk was left for 2000 hours after the recording and read signal intensities obtained are compared. The read signal intensity after the elapse of 2000 hours indicates an output of 99% of that just after the recording, the write signal is hardly deteriorated, and an attenuation of the write signal which is caused by a thermal fluctuation or a demagnetization due to the heat does not occur.

For comparison, a magnetic recording disk having almost the same structure as that of the above disk except that the inorganic compound layer 12 is not formed is manufactured under conditions similar to those mentioned above. The read/write characteristics of the magnetic recording disk for comparison are evaluated by a method similar to that mentioned above, so that since the magnetic wall is easily moved, an edge position of the magnetic domain is not determined and a jitter increases to a value that is four or more times as large as that of the magnetic recording disk of the embodiment. The shape of the magnetic domain is observed by the MFM, so that concave and convex portions exist and noises increase by 3 dB or more.

Although the example in which the magnetic layer was formed on the inorganic compound layer has been mentioned here, it is also possible to form a substrate by using the inorganic compound and directly form a magnetic layer onto the substrate. Although cobalt oxide was used as a material of a crystal phase of the inorganic compound layer in the embodiment, a similar effect can be also obtained by using iron oxide or nickel oxide in place of cobalt oxide. Although silicon oxide was used as a material existing at the crystal grain boundary, a similar effect can be also obtained by using aluminum oxide, titanium oxide, tantalum oxide, or zinc oxide in place of silicon oxide. Further, although the example of using the Co/Pt artificial lattice multilayer as a magnetic layer has been shown here, a similar effect can be also obtained by using a Co/Pd artificial lattice multilayer. As a substrate on which the inorganic compound layer is formed, a similar effect can be also obtained by using a substrate made of a metal such as Al, Al alloy, or the like or a substrate formed by coating NiP onto a substrate of glass, Al, or Al alloy by a plating method besides the glass substrate.

[Embodiment 2]

An information recording media for magneto-optical recording (hereinafter, referred to as a magneto-optical recording disk) is manufactured. A magneto-optical recording disk drive in which such a magneto-optical recording disk has been assembled is formed.

Figure 6:
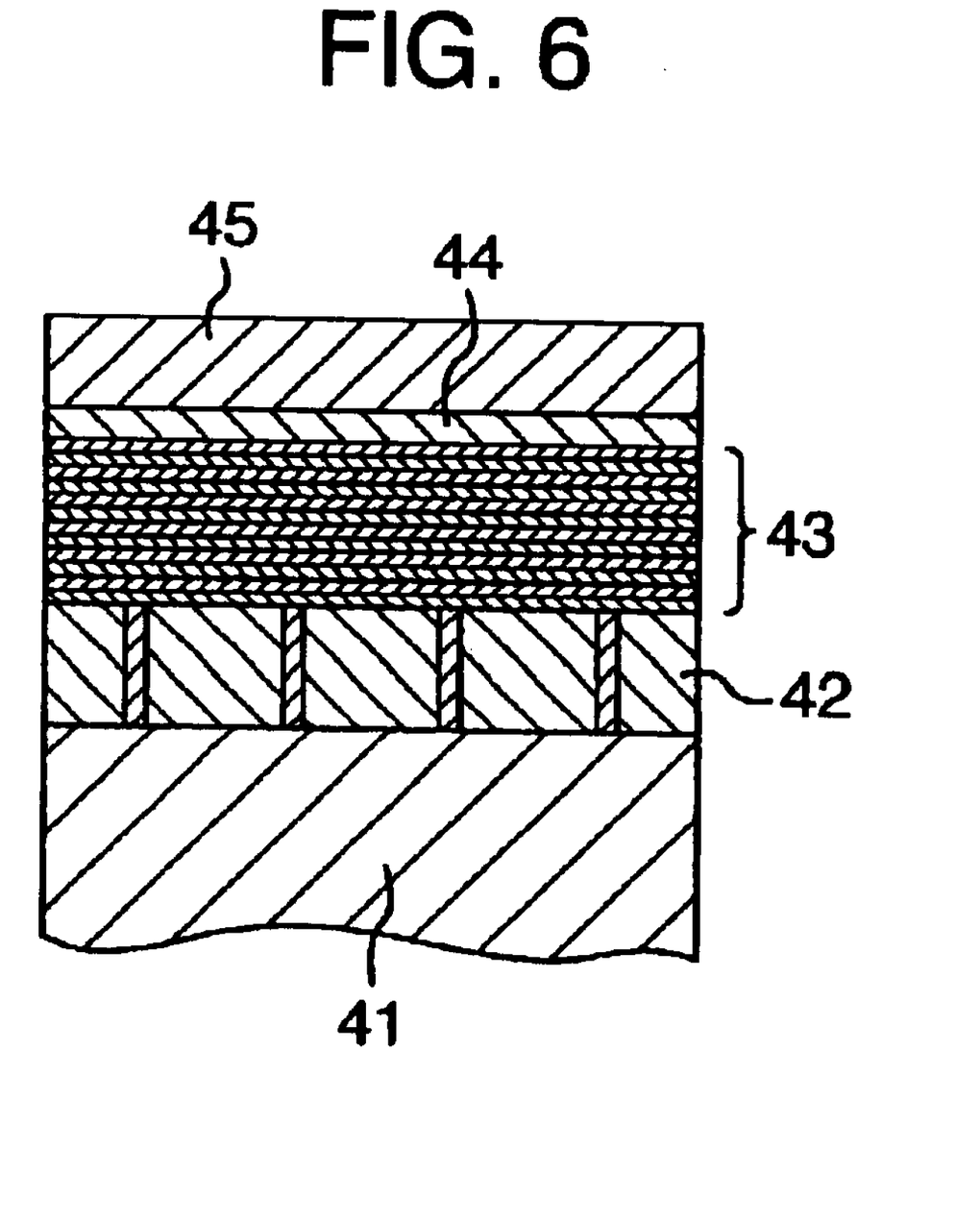
FIG. 6 is a cross sectional schematic diagram of a magneto-optical recording disk.

FIG. 6 is a cross sectional schematic diagram of the manufactured magneto-optical recording disk. The magneto-optical recording disk has a laminated structure obtained by sequentially forming an inorganic compound layer 42, a magnetic layer 43, a magneto-optical enhancement layer 44, and a light reflecting layer 45 onto a substrate 41. A polycarbonate substrate having a diameter of 130 mm in which a guide groove is formed on the surface is used as a substrate 41. To remove the moisture contained in the substrate, the substrate 41 is subjected to a baking treatment in the vacuum for three hours prior to forming a layer. Subsequently, the inorganic compound layer 42 is formed on the substrate 41 by a sputtering method. When the inorganic compound layer 42 is formed, an object obtained by mixing CoO and SiO$_2$ at a mol ratio of 2:1 is used as a target and pure Ar is used as a discharge gas.

A pressure upon sputtering is equal to 3 mTorr, an input RF electric power is equal to 1 kW/150 mmϕ, and a thickness of the formed inorganic compound layer 42 is equal to 65 nm.

The surface of the obtained inorganic compound layer 42 is observed by the TEM, so that a honeycomb structure in which the crystal grains 21 of almost a regular hexagon are two-dimensionally and regularly arranged is observed as shown in FIG. 2. The cross section of the obtained inorganic compound layer 42 is observed by the TEM, so that columnar tissues in the direction perpendicular to the substrate 41 are observed in the cross section of the inorganic compound layer 42 as shown in FIG. 3. The columnar tissues are grown without increasing the dimensions during the growth.

The crystal grain 21 and its grain boundary is analyzed by the EDX analysis ($\mu$-EDX analysis) of a micro region, so that the crystal grain 21 is a Co oxide and SiO$_2$ exists at the grain boundary. The crystalline structure of the inorganic compound layer 42 is analyzed by an X-ray diffraction method, so that a diffraction peak of (220) of CoO is observed at a position near $2\theta = 62.5°$ as shown in FIG. 4. From an observation of a lattice image, it has been found that a cobalt oxide is crystalline and a silicon oxide is amorphous. A lattice constant obtained is almost equal to a value of Co.

A grain-size distribution of the crystal grain 21 in the inorganic compound layer 42 is subsequently measured by a method similar to that in the embodiment 1. The grain-size distribution is a normal distribution, an average of the grain sizes (dimension between the opposite parallel sides) a of the crystal grain 21 is equal to 10 nm, and a standard deviation σ of the grain-size distribution is equal to 0.9 nm. A distance b between the crystal grains is equal to 2 nm. The number of crystal grains existing around one crystal grain is obtained by using the TEM image of the surface of the inorganic compound layer by a method similar to that in the embodiment 1, so that an average of the numbers of crystal grains is equal to 6.02. Also from the above result indicating that the number of crystal grains existing around one crystal grain is equal to 6.02, it is backed up that the crystal grains having hexagonal shapes of similar grain sizes are two-dimensionally and regularly arranged to thereby form a honeycomb structure.

An ultra structure multilayer (artificial lattice layer) is subsequently formed as a magnetic layer 43 onto the inorganic compound layer 42 by alternately laminating a Co layer and a Pt layer. The alternate lamination of the Co layer and Pt layer is performed by the dual simultaneous sputtering method. In this instance, a time difference is provided and a shutter of a sputtering apparatus is opened so that the first layer becomes the Co layer. An input DC electric power is equal to 1 kW/150 mmϕ.

A structure of the formed magnetic layer 43 is observed by the cross sectional TEM. Thus, as for the thickness of magnetic layer, a thickness of Co layer is equal to 0.6 nm and a thickness of Pt layer is equal to 1.8 nm. A thickness of the whole magnetic layer is equal to 20 nm. As for the thickness of Co layer and the thickness of Pt layer (or Pd layer), it is desirable that a ratio of the thicknesses of both of them is set to Pt(Pd):Co=2:1 to 5:1 and the thickness of Co layer is equal to or less than 1 nm. When the thicknesses of the Co layer and Pt layer (or Pd layer) lie within such a range, a perpendicular magnetization layer having excellent magnetic properties can be obtained. The magnetic layer 43 and inorganic compound layer 42 are observed from a crystallographic viewpoint, so that although the Co layer formed on the crystal phase of the obtained inorganic compound layer 42 was epitaxially grown, the Co layer formed on the crystal grain boundary is a bulk substance of micro crystal or a polycrystalline substance. Although a DC sputtering has been used here to form the magnetic layer 43, an RF sputtering or ion beam sputtering can be also used. The magnetic properties and layer structure of the magnetic layer 43 are not influenced by the sputtering system.

After the magneto-optical recording disk was magnetized in a constant direction, the surface is observed by a polarization microscope. Thus, it has been found that although the portion corresponding to the region on the crystal phase of the inorganic compound layer 42 becomes a good perpendicular magnetization layer, the portion corresponding to the region on the grain boundary is not the perpendicular magnetization layer. This result will be understood from the fact that in the region magnetized in the perpendicular direction, when a polarizing plate is rotated, a reversal of light and dark occurs. The portion corresponding to the region on the grain boundary of the inorganic compound layer 42 is held to be gray and the brightness does not change.

A silicon nitride layer having a thickness of 15 nm is formed as a magneto-optical enhancement layer 44. The magneto-optical enhancement layer 44 is formed by using Si as a target and using an Ar/$N_2$ mixture gas as a discharge gas. A pressure of the Ar/$N_2$ mixture gas upon sputtering is equal to 10 mTorr, an input RF power density is equal to 500 W/150 mmϕ, and a refractive index of this layer is equal to 2.1. Finally, an $Al_9Ti_5$ alloy layer having a thickness of 50 nm is formed as a light reflecting layer 45.

Figure 7:
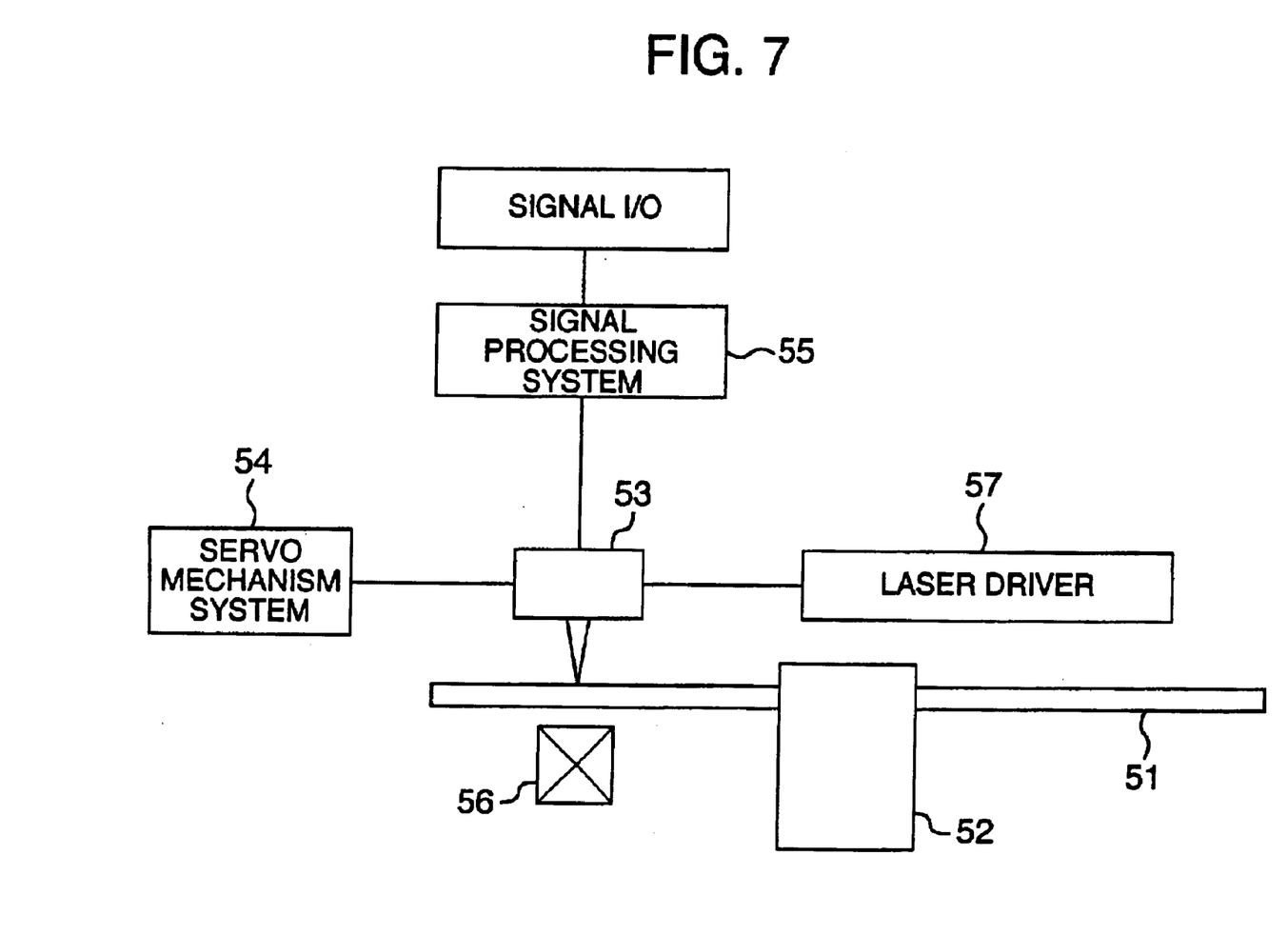
FIG. 7 is a schematic diagram of a magneto-optical recording disk drive.

Magneto-optical properties of the magneto-optical recording disk are measured, so that a Kerr rotational angle is equal to 0.97°, a coercivity is equal to 3.0 kOe, a saturation magnetization is equal to 350 emu/ml, and a perpendicular magnetic anisotropy energy is equal to $5 \times 10^7$ erg/ml. A Currie temperature is equal to 200° C. and a compensation temperature is equal to 120° C. The magneto-optical recording disk manufactured as mentioned above is assembled into a magneto-optical recording disk drive as schematically shown in FIG. 7 and read/write characteristics of the magneto-optical recording disk are evaluated. The magneto-optical recording disk drive is a drive of a well-known construction comprising: a magneto-optical recording media 51; a disk drive system 52 for driving the magneto-optical recording media 51; an optical head 53 for performing a writing and a read to/from the magneto-optical recording media; a servo mechanism system 54 for positioning the optical head 53; a signal processing system 55 for processing a write signal and a read signal of the optical head; magnetic field applying device 56 for applying a magnetic field to a region on the magneto-optical recording media at a place near the optical head upon recording; and a laser driver 57 for driving a laser beam source of the optical head 53.

Information modulated by a (1, 7) RLL system is recorded onto the magneto-optical recording disk by a mark length recording system. A wavelength of the used laser light source is equal to 400 nm, a numerical aperture NA of the lens is equal to 0.59, a shape of a recording pulse is a multipulse, a writing laser power is equal to 8 mW, and a reading laser power is equal to 1.5 mW. When the recording is performed by a specification of 640 MB per disk, a magnetic domain having a diameter of 0.3 μm is formed. The information is read back by using a laser beam of the same wavelength, so that excellent read characteristics in which an S/N ratio is equal to 35 dB are obtained.

When a read-back light is irradiated onto the inorganic compound layer 42, since a refractive index increases and a multiple interference occurs between the magnetic layer 43 and substrate 41 at this time, the Kerr rotational angle increases and a read signal output consequently increases. Therefore, when a read-back light is irradiated to a specific mark, signals from the marks before and after the specific mark suddenly decrease, so that the deterioration of resolution upon read-back due to crosstalks can be suppressed.

For the purpose of comparison, a magneto-optical recording disk having almost the same structure as that mentioned above except that the inorganic compound layer 42 is not formed is manufactured under conditions similar to those mentioned above. Read/write characteristics of the magneto-optical recording disk for comparison are evaluated by a method similar to that mentioned above. Since the magnetic wall is easily moved, a jitter is increased by two or more times. The shape of the formed magnetic domain is observed by the MFM, so that irregular concave and convex portions exist on the circular outline and a noise level is increased by 5 dB or more.

Although the example in which the inorganic compound layer to control a crystallographic orientation of the magnetic layer was formed on the glass substrate has been mentioned, it is also possible to form a substrate by using this inorganic compound layer and directly form the magnetic layer onto this substrate. Although cobalt oxide was used as a material of a crystal phase of the inorganic compound layer in the embodiment, a similar effect can be also obtained by using iron oxide or nickel oxide in place of cobalt oxide. Although silicon oxide was used as a material existing at the crystal grain boundary, a similar effect can be also obtained by using aluminum oxide, titanium oxide, tantalum oxide, or zinc oxide in place of silicon oxide. Further, although the example of using the Co/Pt artificial lattice multilayer as a magnetic layer has been shown here, a similar effect can be also obtained by using a Co/Pd artificial lattice multilayer. As a substrate, a similar effect can be also obtained by using amorphous olefin, epoxy resin, polymethyl methacrylate, or the like in place of polycarbonate.

According to the invention, since the distribution of the magnetic properties is formed in the magnetic layer and the pinning site for obstructing the movement of the magnetic wall is formed, the jitter and the disk noises are reduced, and the high density magnetic recording can be accomplished.

What is claimed is:

1. An information recording drive comprising:

magnetic recording media;

a magnetic recording media driver;

a magnetic head for performing writing and reading to/from the magnetic recording media;

a magnetic head access system; and a read-write signal processing system;

wherein the magnetic recording media comprises a substrate, an inorganic compound layer formed on said substrate, and a magnetic layer formed on said inorganic compound layer;

and further wherein said inorganic compound layer has a honeycomb structure in which crystal grains which are hexagonal in an in-plane direction are two-dimensionally and regularly arranged, and constructed by a crystal grain of an oxide of at least one kind selected from cobalt oxide, iron oxide, and nickel oxide and an oxide which exists at a grain boundary of said crystal grain and is amorphous and made of at least one kind selected from silicon oxide, aluminum oxide, titanium oxide, tantalum oxide, and zinc oxide; and wherein said magnetic layer is an artificial lattice multilayer obtained by alternately laminating a Co layer or a layer made of an alloy having Co as a main phase and a layer having a metal element of at least one kind selected from Pt and Pd.

2. An information recording drive according to claim 1, wherein said crystal grain in said inorganic compound layer has a grain-size distribution in which a standard deviation of the grain-size distribution of the crystal grain when it is seen in the in-plane direction is equal to or less than 10% of an average grain size.

3. An information recording drive according to claim 2, wherein a thickness of said inorganic compound layer lies within a range from 10 nm or more to 100 nm or less.

4. An information recording drive according to claim 1, wherein magnetic properties of said magnetic layer are different in dependence on a portion grown on the crystal grain of said inorganic compound layer and a portion grown on the grain boundary of said crystal grain.

5. An information recording drive according to claim 1, wherein the Co layer of said magnetic layer is in contact with said inorganic compound layer.

6. An information recording drive according to claim 3, wherein magnetic properties of said magnetic layer are different in dependence on a portion grown on the crystal grain of said inorganic compound layer and a portion grown on the grain boundary of said crystal grain.

7. An information recording drive according to claim 4, wherein the Co layer of said magnetic layer is in contact with said inorganic compound layer.

* * * * *

UNITED STATES PATENT AND TRADEMARK OFFICE
CERTIFICATE OF CORRECTION

PATENT NO. : 6,749,955 B2
DATED : June 15, 2004
INVENTOR(S) : Kirino et al.

It is certified that error appears in the above-identified patent and that said Letters Patent is hereby corrected as shown below:

Column 12,
Line 10, replace claim 2 with the following

2. An information recording drive comprising:
   magnetic recording media;
   a magnetic recording media driver;
   a magnetic head for performing writing and reading to/from the magnetic recording media;
   a magnetic head access system; and
   a read-write signal processing system;
   wherein the magnetic recording media comprises a substrate, an inorganic compound layer formed on said substrate, and a magnetic layer formed on said inorganic compound layer;
   and further wherein said inorganic compound layer has a honeycomb structure in which crystal grains which are hexagonal in an in-plane direction are two-dimensionally and regularly arranged, and constructed by a crystal grain of an oxide of at least one kind selected from cobalt oxide, iron oxide, and nickel oxide and an oxide which exists at a grain boundary of said crystal grain and is amorphous and made of at least one kind selected from silicon oxide, aluminum oxide, titanium oxide, tantalum oxide, and zinc oxide;
   wherein said magnetic layer is an artificial lattice multilayer obtained by alternately laminating a Co layer or a layer made of an alloy having Co as a main phase and a layer having a metal element of at least one kind selected from Pt and Pd;
   wherein said crystal grain in said inorganic compound layer has a grain-size distribution in which a standard deviation of the grain-size distribution of the crystal grain when it is seen in the in-plane direction is equal to or less than 10% of an average grain size.

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,749,955 B2  
DATED : June 15, 2004  
INVENTOR(S) : Kirino et al.

Page 1 of 1

It is certified that error appears in the above-identified patent and that said Letters Patent is hereby corrected as shown below:

Title page,
Item [*] Notice, add the following:
-- This Patent is subject to a terminal disclaimer. --.

Signed and Sealed this

Tenth Day of January, 2006

JON W. DUDAS
*Director of the United States Patent and Trademark Office*